Dec. 28, 1943.  J. MILLS ET AL  2,338,003
PROCESS OF PACKAGING AND STERILIZING FOOD PRODUCTS
Filed Feb. 13, 1942  3 Sheets-Sheet 3
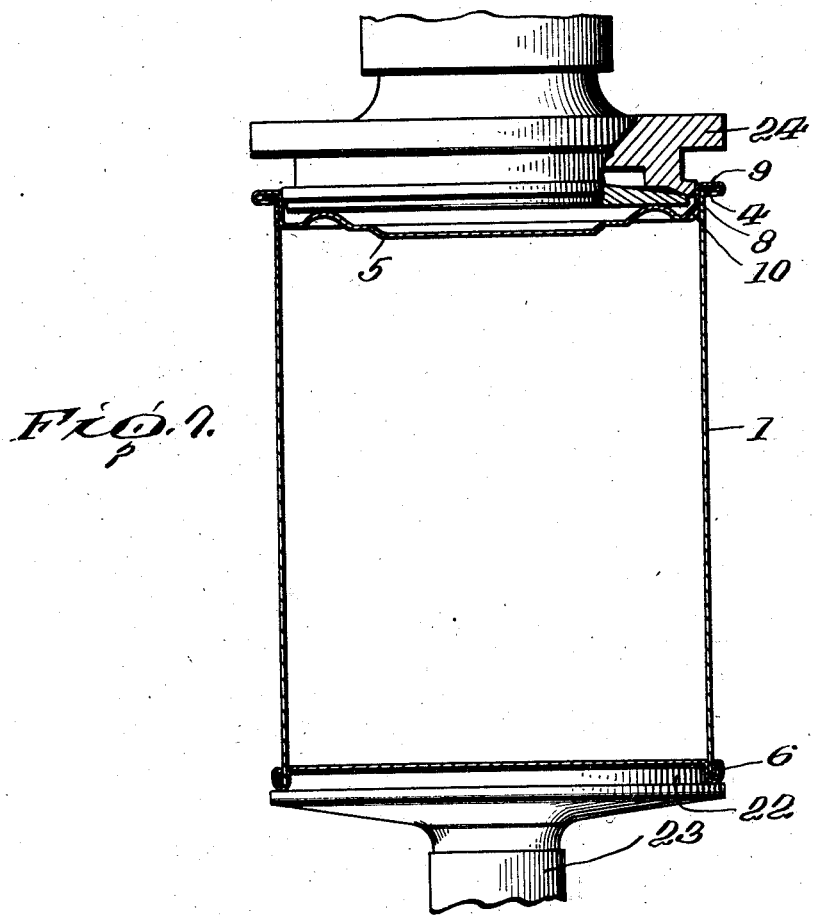
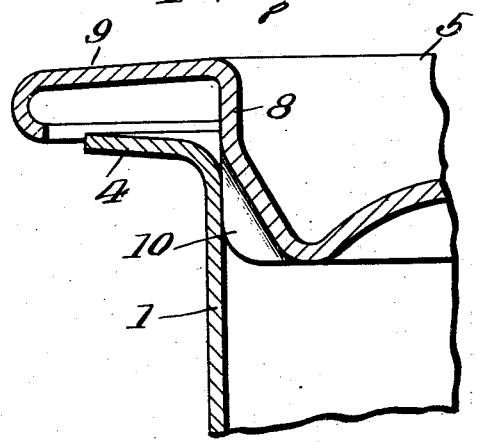
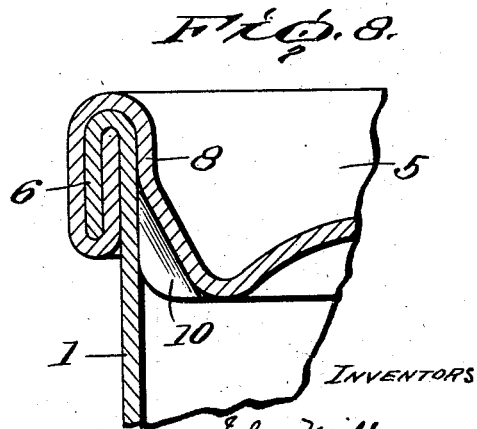
INVENTORS
John Mills
Charles W. Lang
By Mason & Porter
ATTORNEYS Patented Dec. 28, 1943

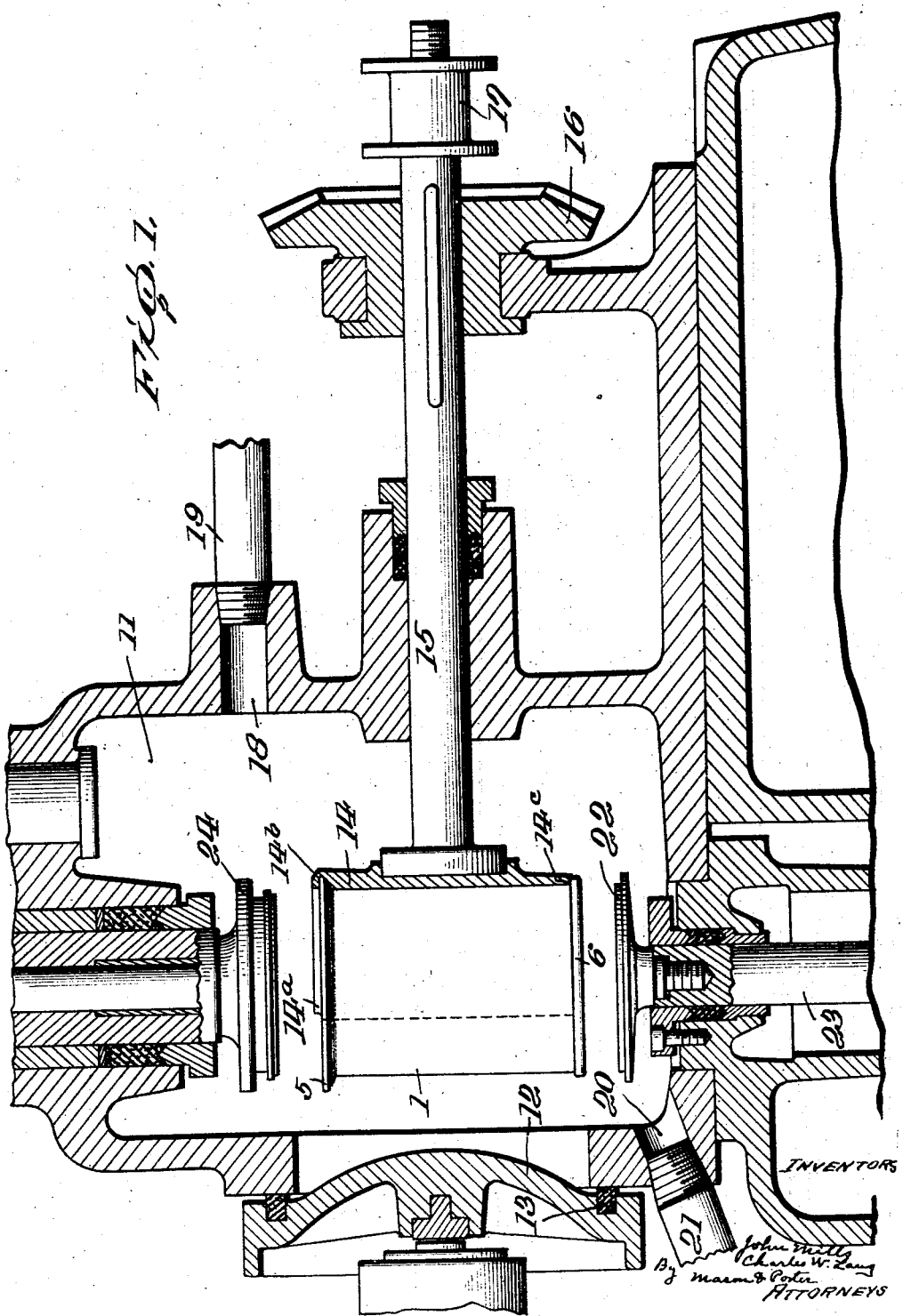

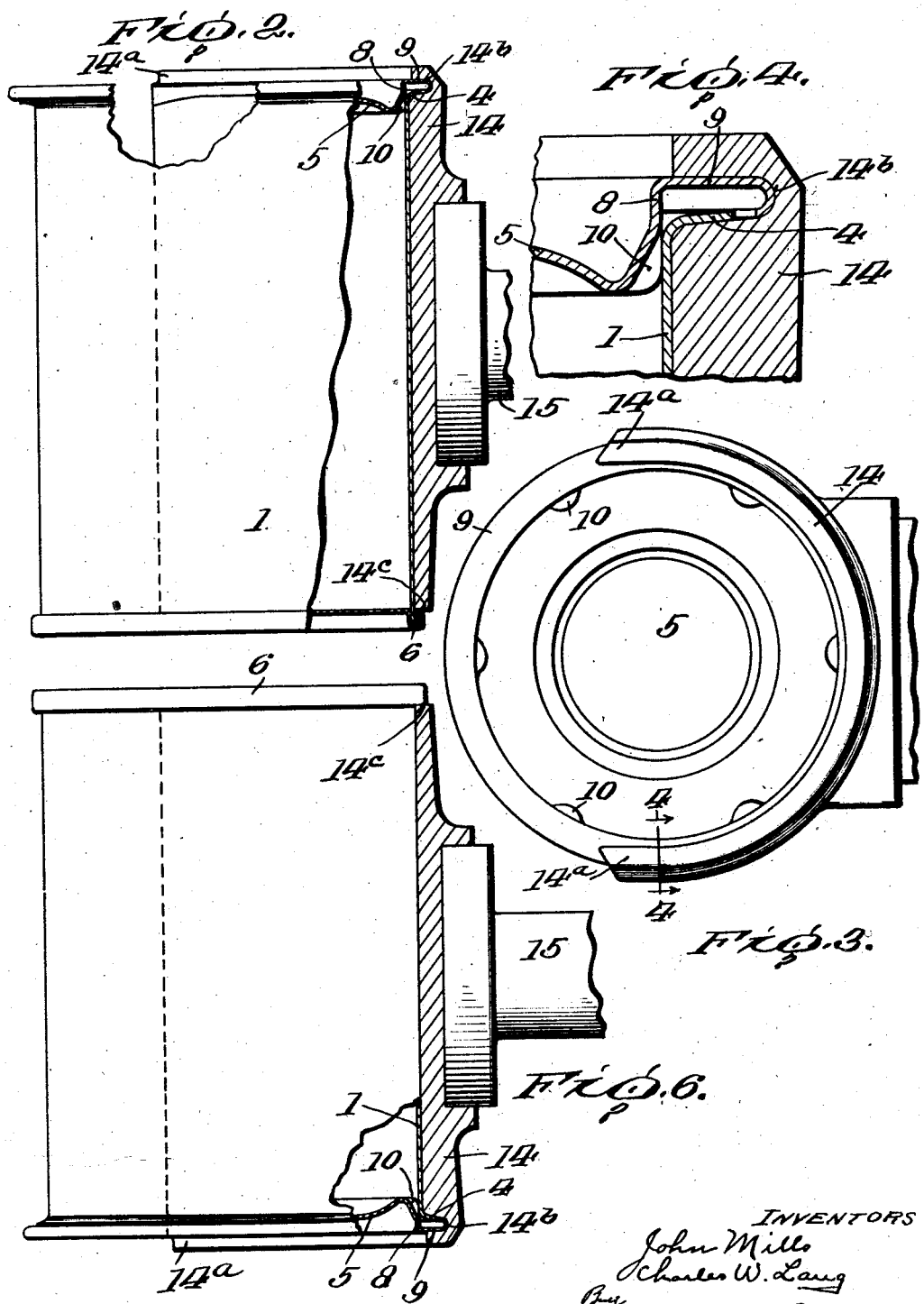

2,338,003

UNITED STATES PATENT OFFICE 2,338,003

PROCESS OF PACKAGING AND STERILIZING FOOD PRODUCTS

John Mills, Winter Haven, Fla., and Charles W. Lang, Haddonfield, N. J., assignors to Continental Can Company, Inc., New York, N. Y., a corporation of New York Application February 13, 1942, Serial No. 430,818

8 Claims. (Cl. 99—182)

The invention relates to new and useful improvements in the process of packaging and sterilizing food products in the containers in which they are to be marketed, and more particularly to a process wherein the food product, after it has been placed in the container therefor, is subjected to direct contact of steam at a pressure well above atmospheric pressure and for a short period of time.

An object of the invention is to provide a process of the above type wherein the steam used for treating the product within the container is caused to surround the container at a relatively low pressure and is gradually increased to a maximum treating pressure so as to permit the steam to enter the container through restricted passages in the closure means therefor and thus create such pressure condition internally and externally as will prevent undue strain upon the container.

A further object of the invention is to provide a process of the above type wherein the container is subjected to a preliminary treatment for eliminating the greater portion of the air from the headspace in the container.

A further object of the invention is to provide a process of the above type wherein the container after it is surrounded with an atmosphere of steam at relatively low pressure is inverted for the completing of the steam treatment.

A still further object of the invention is to provide a process of the above type wherein the container is sealed while surrounded with steam at a pressure at least as great as the internal pressure created within the container during treatment.

A still further object of the invention is to provide a process of the above type wherein the container after it is sealed may be held for a period of time substantially at the treating temperature so as to continue the sterilizing process on the food product.

A further object of the invention is to provide a process of the above type wherein the wall of the container after treatment and sealing may be subjected to a cooling fluid for gradually reducing the internal pressure.

These and other objects will in part be obvious and will in part be hereinafter more fully described.

In the drawings which show by way of illustration some of the steps of applicants' process Figure 1 is a view in section through a closed chamber in which the container and food product therein may be subjected to applicants' process of sterilizing.

Figure 2 is a diagrammatic view showing the container and the supporting means therefor during the treatment for removing the air from the food product and headspace of the container.

Figure 3 is a plan view of the supporting means for the container positioned as shown in Figure 2.

Figure 4 is a sectional view of the line 4—4 of Figure 3 on an enlarged scale.

Figure 5 is a sectional view through the container and closure means therefor on an enlarged scale with the closure means positioned in the container so as to provide open restricted passages through which gases may pass into and out of the container.

Figure 6 is a view showing the container inverted so that steam admitted into the container for sterilizing the food product may pass up through the food product.

Figure 7 is a view showing the container returned to an upright position and chucked for seaming.

Figure 8 is a sectional view through the container closure means and the body wall on an enlarged scale after the closure means have been double seamed to the container body.

In carrying out the process, the food product is placed in a container in which it is to be marketed. The container preferably is of the open top type and is closed by an end member which is secured thereto by double seaming. The end member is constructed in novel manner so that when partly seated in the open end of the container there are restricted open passages through which gases may pass into the container. The container with the end member seated so as to leave the passages open is placed in a chamber which is adapted to be sealed. Steam is admitted to the chamber with an exhaust port open so that the steam passes into and out of the chamber thus sweeping all the air out of the chamber and surrounding the container with an atmosphere of steam at a relatively low pressure. The exhaust is then closed and the container inverted, after which the steam pressure is gradually increased until it reaches a maximum treating pressure. The steam enters the restricted passages and passes into and through the food product. This direct contact of the steam with the food product sterilizes the same. When the pressure of the steam is relatively low when the container is inverted and then gradually increased, the internal pressure will build up so as to substantially balance the external pressure on the container and prevent undue strains on the container and the collapsing of the same. While the steam pressure surrounding the container is at least as great as the internal pressure within the container, the container is sealed. This may be accomplished while the container is inverted, but preferably the container is brought back to an upright position before it is sealed. The purpose of sealing the container while the pressure surrounding the container is at least as great as the internal pressure is to prevent the internal pressure forcing liquid from the container. This is in case, of course, that the food product is in liquid form or contains a syrup, sauce or other desirable liquid ingredient. If the product is a dry product and it is desired to maintain the product in a dry condition after steam treatment, then the external pressure is reduced below the internal pressure so that any liquid condensate accumulated in the product during the steam treatment will be forced out through the restricted passages. In this case the container is not sealed until after the pressure has been reduced and the condensate eliminated from the container.

It is desirable to give the container a preliminary treatment so as to eliminate a greater portion of the air from the headspace as this greatly facilitates the steam treating of the product within the container after it is inverted. There are several ways in which this preliminary treatment may be carried out for eliminating the air from the headspace, but it is preferred to accomplish this elimination of the air by a preheating of the food product and the container. With certain products which are packed in syrup, such as corn, it is preferable to pass the container with the product and the syrup therein through an exhaust box. This will cause the heating of the product in the container and create a steam vapor which, rising from the product, will force the air out of the headspace of the container. Products generally referred to in the trade as "vacuum-packed" contain a small amount of syrup or liquid and may be treated in the same manner and the liquid will form a vapor which will force a greater portion of the air out of the headspace. In preheating products such as liquids, chocolate milk, soups and the like, it is preferred to preheat the liquid before it is put into the container. Here again the hot vapor rising from the product will eliminate a greater portion of the air from the headspace. After this preheating treatment has eliminated a greater portion of the air from the headspace, the end closure is applied in such a way as to provide the restricted open passages and then the container is subjected to the steam treatment referred to above.

Another way in which the air may be eliminated from the headspace is by subjecting the container after the end is applied thereto with the restricted passages open to a vacuum treatment for withdrawing the air from the headspace.

Still another way in which the air may be eliminated consists in surrounding the container with an atmosphere of steam at a greater pressure than the internal pressure so as to cause steam to enter the headspace and and then reducing the steam pressure so as to permit the hot vapors to expand and pass out of the container through the passages carrying with them air from the headspace. The preferred method, however, consists in preheating the product in the manner described above because the preheated product is in a more receptive condition for the hot, sterilizing steam.

After the container is sealed, it may be held for a short period of time at a relatively high temperature so that the sterilizing process will continue and in connection with some food products a sufficient time for cooking the food product. A cooling medium such as water is then directed onto a wall of the container for reducing the internal temperature to a point so that the container can be safely withdrawn from the treating chamber without subjecting the seams to too great a strain. The container after it is removed from the treating chamber may be held at atmospheric pressure for continuing the processing or it may be cooled in the usual well known way and is ready for storage.

It is thought that the process will be better understood by a brief description of an apparatus which may be used for carrying out the process and the application of the process to the packaging of a few specific products. The apparatus illustrated in the drawings is a laboratory machine designed for carrying out applicants' steam treating process. The machine is only shown in a fragmentary manner. The other steps of the method will be obvious from the description given.

The container illustrated in the drawings includes a body portion 1 having a bottom end secured thereto by double seaming in the usual manner. The top end is open and is flanged as indicated at 4. The closure member 5 is provided with a portion 9 which extends outwardly over the flange and which is curled at its peripheral edge so as to facilitate the forming of a double seam, such as indicated at 6 in Figure 8 of the drawings. The container end is provided with a depression surrounded by a wall 8. This depression is made of greater depth than the usual depression in a can end, and at spaced intervals the metal of the vertical wall 8 and the bottom wall of the depression are bent inwardly so as to provide channels 10. When the end is placed on the container, as shown in Figure 4, these channels 10 provide restricted passages through which gases may pass into and out of the headspace of the container. The container which is shown in the drawings is described more in detail and claimed in a co-pending application filed by John Mills and Charles W. Lang on October 30, 1941, under Serial No. 417,196.

Applicant's process is particularly adapted for the packaging of food products in what is referred to as an open top container. The closure member, while when initially attached provides restricted openings through which gases may pass into and out of the headspace of the container, when fully seated in the container may be secured to the body portion by the usual double seam employed in the closing of open top containers.

In the packaging of corn, the corn is placed in a container of the above type with about eighty percent of the usual volume of syrup or brine. This syrup or brine is concentrated so that it contains the usual amount of solids for the normal fill of a container. Some of the steam during the treatment of the food product condenses and this will cause the volume of syrup or brine to increase to the standard requirement without overfill. The containers with the corn and brine therein are passed through an exhaust box not illustrated in the drawings. During this treatment the food product would be heated to about 200° or a little over and this will drive out some of the $CO_2$ gas from the corn and also air entrained therein and in the headspace leaving a hot vapor in the headspace.

The cover or closure end is then placed on the container and seated sufficiently so as to permit free handling and movement of the container without dislodging the closure end therefrom. The container with the end assembled is either placed in or passed into a chamber 11. As shown in Figure 1, this chamber 11 is closed by a door 12 and a sealing gasket 23 is provided for hermetically sealing the chamber. In this chamber is a support 14 in which the container is placed. This support 14 is mounted on a shaft 15 extending through the wall of the chamber. The shaft is splined to a gear 16 whereby it may be rotated and on the shaft is a sleeve 17 whereby the shaft may be moved endwise in the bearing therefor.

The support 14 is U-shaped as shown in Figure 3 and the diameter of the curved portion is only slightly larger than the diameter of the container 1. This support has projecting portions 14a which are tangential to the curved portion and parallel with each other. As shown in Figure 4 the support has a channel 14b formed therein, the entrance end of which is slightly tapered to facilitate the insertion of the flange of the container body and the closure end in the channel. The closure end as shown in Figure 5 is partly seated so that the down-turned edge portion of the flange of the cover is slightly above the flange 4 of the container body 1. This leaves the channels 10 open. When the cover is seated after it is assembled on the body portion to this extent, it will remain firmly attached thereto. If it is inserted to a greater extent so as to close the channels, then when the flange of the body slides along the bottom wall of the channel, the cover will be slightly lifted so as to position it as shown in Figure 5 of the drawings. This insures that the channels 10 shall be open. The double seam 6 at the bottom end of the container will pass beneath the lower edge 14c of the support 14. Thus it is that the container is firmly seated in this support 14 with the cover so positioned that the channels 10 are open.

There is a port 18 leading into the chamber 11 and a steam supply pipe 19 is connected thereto having the usual form of control valve. There is also a port 20 leading from the chamber to which a pipe 21 is connected through which the chamber may be exhausted without opening the door 12. This pipe is likewise controlled by a valve. After the container is placed in the support 14 with the channels open, the steam is admitted through the pipe 19 with the exhaust open so that the steam will drive all the air out of the chamber. This eliminating of air from the chamber so as to surround the container with an atmosphere of steam prevents any carrying of entrained air into the container during the steam treatment of the food product which is to follow.

The exhaust valve is then closed and steam admitted to the chamber 11 so as to gradually increase the pressure. Just as soon as the pressure externally of the container is greater than the internal pressure, the container is inverted. This is accomplished by turning the shaft 15. Inasmuch as the double seam 6 overlies the bottom edge of the support when the container is inverted, the channels or passages 10 will still remain open. The syrup or brine does not pass out through these passages which are now at the bottom end of the container due to the external pressure being greater than the internal pressure. After the container is inverted, the steam pressure continues to build up and the steam will enter the container, condense, giving up its heat, and continue to flow into the container through these open passages until such time as the pressure differential is diminished sufficiently to stop the flow.

It will be noted that these channels or passages 10 are at the periphery of the closure member so that the steam entering will enter the container close to the side walls of the container and this greatly facilitates the steam passing up through the food product and permeating the same from all directions. Inasmuch as pressure gradually increases, the internal pressure will have time to build up so that the container is not put under undue strain which would be likely to collapse the walls of the container. In the treatment of corn, this steam pressure is increased to between 50 and 60 pounds and the entire treatment for effectively sterilizing the product can be accomplished in from 7 to 15 seconds.

The pressure and the time limits are referred to purely for the purpose of illustrating the advantages of the process. With different food products, the pressure to which the steam is increased and the time period are varied to suit the particular product being treated.

Upon the completion of the steam treatment, the container is sealed. In connection with products containing liquid it is essential that the sealing of the container shall be accomplished before the external pressure is reduced to a point below the internal pressure as otherwise the internal pressure would force the liquid out through the open restricted passages. As already noted in connection with the packaging of certain food products, where it is desired to eliminate any liquid of condensation forming in the container, then the pressure surrounding the container is reduced below the internal pressure so that the liquid will be forced out through the open passages before the sealing of the container is accomplished.

Returning again to the process as applied to the packaging of corn, after this steam treatment of the product through direct contact of steam with the product, the container is preferably returned to an upright position by again rotating the shaft 15. Mounted in the bottom wall of the chamber 11 is a container support 22 carried by a rod 23 which may be raised and lowered in the bearing therefor. Also mounted in the upper part of the chamber 11 is a seaming mechanism for double seaming the cover to the container. The only portion illustrated is the chuck 24. It is noted that the support 22 for the container and the chuck 24 are separated some distance from each other so that the container with the cover assembled thereon can be placed in the support 14 and the support 14 rotated for inverting the container for the steam treatment. After this final steam treatment and the container has been returned to its upright position, then the container support 22 is raised into engagement with the bottom end of the container. As the container support is raised into engagement with the bottom of the cam, the knock-out or ejector pad associated with the seaming mechanism moves down simultaneously into engagement with the top of the can so that the can is firmly held between the pad and the support 22. The support 14 is then withdrawn by moving the shaft 15 endwise. It is preferable to rotate the container during the seaming operation as this aids in eliminating any temperature irregularities within the container by imparting motion to the brine. However, this is not essential and neither is it essential to return the container to upright position for seaming. It is only returned to this position for mechanical reasons.

In the packaging of corn, after the container is sealed, it is held from 15 to 30 seconds under the maximum steam pressure applied to the chamber so that the sterilizing process will continue at this relatively high temperature.

After the sealing operation and holding operation are completed, cold water is admitted into the chamber and onto the container and preferably the closure end of the container. This contact of the water with the closure end will cause the water to turn into vapor and the heat to transfer through the part with which the water contacts and reduce the internal pressure and temperature to a point so that the container can be safely withdrawn from the treating chamber. During this cooling operation, the steam pressure is preferably reduced to from 20 to 30 pounds.

After the container is removed from the chamber, it is held at atmospheric pressure for a period of two to three minutes and during this sustaining period the processing continues within the container. The closed containers are then cooled by the usual step of immersing the same in water or by other cooling means and are then ready for storage.

The process which has been described above may be used in connection with peas, string beans, lima beans, navy beans, fruits, chocolate milk, cream soups, spaghetti and many other food products. The process, of course, will be modified to some extent in connection with the various products. Again, in some cases the steam pressure during the treating of the food product by contact with the steam must be lowered in order not to injure the product. In connection with the milk product, the steam pressure for treating would preferably be limited to between 45 and 55 pounds and no sustaining period would be necessary, but immediate cooling would be important. In connection with fruits, the processing pressure would be considerably lower and the immediate cooling may not be necessary. Again, in some cases it may be considered desirable to give the product some cooking treatment which may be accomplished by the lengthening of the sustaining period prior to cooling. As for example, in connection with dry lima beans the sustaining period should be increased for cooking, but this is not necessary in connection with the fresh lima beans. In connection with spaghetti no precooking is required, but the spaghetti is put at once into the cans with the concentrated sauce. In connection with kidney beans, it is preferred to eliminate the presoaking step, but the process can be applied to presoaked beans when this procedure is desired. In connection with kidney beans, it may be noted that they can be put up with just enough syrup so as to moisten the beans in the final canned product or, if desired, more sauce can be used, but it is not necessary to use a brine which completely covers the beans. This is a great saving as under the present methods where beans are canned in brine covering the same, the brine is thrown away and the beans also lose considerable of their color.

It will be noted from the above description the various uses to which the process described may be applied and the variations mentioned in the steps of the process that the essential features of applicants' process reside first, in the preliminary treatment of the headspace for removing air therefrom; second, in the eliminating of the air from the chamber in which the container is to be steam-treated by passing steam therethrough at a relatively low pressure, after which the chamber is completely closed; third, the inverting of the container with the restricted passages open and then gradually increasing the steam pressure so as to permit the steam to enter through the restricted passages into the food product and build up an internal pressure which will prevent the external pressure from collapsing or straining the container; fourth, the sealing of the container when the food product contains a liquid ingredient while the external pressure is at least as great as the internal pressure. Other steps which are essential to certain food products are the maintaining of the container after it is sealed in the presence of the steam at a high temperature for further sterilizing or cooking the product and the cooling of the wall of the container so as to reduce the internal pressure to a point so that the container may be safely removed from the chamber wherein it is treated, and held at a temperature which will continue the sterilizing effect upon the product. Afterwards the container is further cooled for storage.

One of the advantages of applicants' process is that the product produced has a better color and a better flavor. This is particularly true in the application of the process to the packaging of corn.

While the process has been described as applied to the packaging of food products in a specific form of container, it will be understood that the container and the closure means therefor may be greatly varied for use in connection with this process, the essential feature being that there shall be restricted passages leading to the headspace of the container for the steam to enter.

We claim:

1. The process of packaging food products in containers for marketing consisting in placing the food product in the container, applying a closure member to the container having restricted passages through which gases may pass into the container, surrounding the container with an atmosphere of steam at a relatively low pressure, inverting the container and gradually increasing the pressure of the steam surrounding the container for causing the steam to enter the container and contact with the food product for sterilizing the same, and sealing the container while surrounded with steam at a pressure at least as great as the internal pressure within the container.

2. The process of packaging food products in containers for marketing consisting in placing the food product in the container, applying a closure member to the container having restricted passages through which gases may pass into the container, placing the container in a chamber adapted to be sealed, passing steam through the chamber for removing air from the chamber and surrounding the container with steam at a relatively low pressure, inverting the container and gradually increasing the steam pressure for forcing steam into the container and into the product for sterilizing the same and sealing the container while surrounded with steam at a pressure at least as great as the internal pressure within the container.

3. The process of packaging food products in containers for marketing consisting in placing the food product in the container, heating the food product for causing the heated vapor arising from the food product to eliminate air from the head space in the container, applying a closure member to the container having restricted passages through which gas may pass into the container, surrounding the container with steam at relatively low pressure, inverting the container and gradually increasing the pressure of the steam surrounding the container for causing the steam to enter the container and contact with the food product for sterilizing the same, and sealing the container while surrounded with steam at a pressure at least as great as the internal pressure within the container.

4. The process of packaging food products in containers for marketing consisting in placing the food product in the container, heating the food product for causing the heated vapor arising from the food product to eliminate air from the head space in the container, applying a closure member to the container having restricted passages through which gas may pass into the container, placing the container in a chamber adapted to seal, passing steam through the chamber for removing air from the chamber and surrounding the container with steam at a relatively low pressure, inverting the container and gradually increasing the steam pressure for forcing steam into the container and into the product for sterilizing the same, and sealing the container while surrounded with steam at a pressure at least as great as the internal pressure within the container.

5. The process of packaging food products in containers for marketing consisting in placing the food product in the container, applying a closure member to the container having restricted passages through which gases may pass into the container, surrounding the container with an atmosphere of steam at a relatively low pressure, inverting the container and gradually increasing the pressure of the steam surrounding the container for causing the steam to enter the container and contact with the food product for sterilizing the same, and sealing the container while surrounded with steam, holding the sealed container substantially at the treating temperature for continuing the sterilizing of the product and subject a wall of the container to a cooling fluid for reducing the internal pressure and then gradually reducing the steam pressure externally of the container to avoid excess strains on the seams.

6. The process of packaging food products in containers for marketing consisting in placing the food product in the container, applying a closure member to the container having restricted passages through which gases may pass into the container, placing the container in a chamber adapted to be sealed, passing steam through the chamber for removing air from the chamber and surrounding the container with steam at a relatively low pressure, inverting the container and gradually increasing the steam pressure for forcing steam into the container and into the product for sterilizing the same and sealing the container while surrounded with steam at a pressure at least as great as the internal pressure within the container, holding the sealed container substantially at the treating temperature for continuing the sterilizing of the product, applying a cooling medium to the wall of the container at the end of the holding period for reducing the internal pressure and simultaneously reducing the steam pressure surrounding the container, and finally cooling the container for storage.

7. The process of packaging food products such as corn in containers for marketing consisting in filling the container with the food product, passing the container with the cover off through an exhaust box for preheating the product and eliminating air from the head space in the container, placing a closure member on the container having passages through which gases may pass into the container, surrounding the container with an atmosphere of steam at a pressure from 3 to 5 pounds, inverting the container and increasing the steam passage surrounding the container gradually to 50 or 60 pounds for causing the steam to enter the container and the food product therein, terminating said last named steam treatment in from 7 to 15 seconds and sealing the container with the steam surrounding the container at a pressure at least as great as the internal pressure within the container, maintaining the sealed container in the presence of steam at high pressure for from 15 to 30 seconds, then cooling the product in the container and reducing the external pressure to atmospheric pressure for storage.

8. The process of packaging food products in containers for marketing consisting in placing the food product in the container, applying a closure member to the container having restricted passages through which gases may pass into the container, surrounding the container with an atmosphere of steam at a relatively low pressure, inverting the container and gradually increasing the pressure of the steam surrounding the container causing the steam to enter the container and contact with the food product for sterilizing the same, reducing the external pressure below that of the internal pressure so that water of condensation is forced from the container through the passages, and sealing the container.

JOHN MILLS.
CHARLES W. LANG.